US008769675B2

(12) United States Patent
Betouin et al.

(10) Patent No.: US 8,769,675 B2
(45) Date of Patent: Jul. 1, 2014

(54) CLOCK ROLL FORWARD DETECTION

(75) Inventors: Pierre Betouin, Paris (FR); Augustin J. Farrugia, Cupertino, CA (US); Nicholas Sullivan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1131 days.

(21) Appl. No.: 12/120,146

(22) Filed: May 13, 2008

(65) Prior Publication Data

US 2009/0287942 A1    Nov. 19, 2009

(51) Int. Cl.
G06F 21/00    (2013.01)
G06F 21/10    (2013.01)
G06F 21/57    (2013.01)

(52) U.S. Cl.
CPC .............. G06F 21/10 (2013.01); G06F 21/57 (2013.01)
USPC .................... 726/22; 726/4; 726/23; 713/189

(58) Field of Classification Search
CPC .................................. G06F 21/10; G06F 21/57
USPC ...................................... 726/27, 31; 380/278
See application file for complete search history.

(56) References Cited

U.S. PATENT DOCUMENTS

| | | | |
|---|---|---|---|
| 5,757,908 A | 5/1998 | Cooper et al. | |
| 5,883,954 A | 3/1999 | Ronning | |
| 5,892,900 A | 4/1999 | Ginter et al. | |
| 6,098,054 A | 8/2000 | McCollom et al. | |
| 6,230,064 B1 | 5/2001 | Nakase et al. | |
| 6,282,175 B1 | 8/2001 | Steele et al. | |
| 6,393,126 B1 | 5/2002 | van der Kaay et al. | |
| 7,111,026 B2 | 9/2006 | Sato | |
| 7,124,302 B2 | 10/2006 | Ginter et al. | |
| 7,552,148 B2 * | 6/2009 | Liu et al. ............... | 1/1 |
| 2002/0019814 A1 | 2/2002 | Ganesan | |
| 2002/0120465 A1 | 8/2002 | Mori et al. | |
| 2002/0157002 A1 | 10/2002 | Messerges et al. | |
| 2002/0169974 A1 * | 11/2002 | McKune ............... | 713/200 |
| 2002/0196940 A1 * | 12/2002 | Isaacson et al. ............... | 380/227 |
| 2003/0120939 A1 * | 6/2003 | Hughes et al. ............... | 713/191 |
| 2004/0024688 A1 | 2/2004 | Bi et al. | |
| 2004/0054894 A1 | 3/2004 | Lambert | |

(Continued)

FOREIGN PATENT DOCUMENTS

| | | |
|---|---|---|
| EP | 1055990 | 11/2000 |
| EP | 1056010 | 11/2000 |

(Continued)

OTHER PUBLICATIONS

Herberg, "Integrity Check Value and Timestamp TLV Definitions for Mobile Ad Hoc Networks (MANETs)", May 1, 2012, Internet Society, p. 1-21.*

(Continued)

*Primary Examiner* — Thanhnga B Truong
*Assistant Examiner* — Gregory Lane
(74) *Attorney, Agent, or Firm* — Adeli LLP

(57) ABSTRACT

Method and apparatus to detect clock roll-forward attacks in a computing device or similar system. This protects against hackers who tamper with the system clock of, for instance, a digital media playback device in order to access a content item which has been rented for a limited time. By detecting clock roll-forward tampering, the present method and system prevent such hackers from accessing the content item outside its authorized rental time period.

25 Claims, 2 Drawing Sheets

(56) References Cited

U.S. PATENT DOCUMENTS

| | | |
|---|---|---|
| 2004/0059813 A1 | 3/2004 | Bolder et al. |
| 2004/0162787 A1* | 8/2004 | Madison et al. ................ 705/64 |
| 2004/0187014 A1 | 9/2004 | Molaro |
| 2005/0132122 A1 | 6/2005 | Rozas |
| 2005/0188222 A1 | 8/2005 | Motsinger et al. |
| 2005/0204209 A1 | 9/2005 | Vataja |
| 2005/0289072 A1 | 12/2005 | Sabharwal |
| 2006/0008256 A1 | 1/2006 | Khedouri et al. |
| 2006/0015717 A1 | 1/2006 | Liu et al. |
| 2006/0064762 A1* | 3/2006 | Kayashima et al. ............ 726/27 |
| 2006/0190535 A1* | 8/2006 | Kaitaniemi et al. .......... 709/203 |
| 2007/0143844 A1 | 6/2007 | Richardson et al. |
| 2007/0168484 A1 | 7/2007 | Koelle et al. |
| 2007/0183742 A1* | 8/2007 | Cowgill .......................... 386/69 |
| 2007/0204064 A1* | 8/2007 | Mail et al. .................... 709/246 |
| 2008/0126773 A1 | 5/2008 | Martinez et al. |
| 2008/0134297 A1* | 6/2008 | Clinick et al. .................... 726/4 |
| 2008/0152146 A1* | 6/2008 | Conrado et al. ............. 380/278 |
| 2008/0229113 A1* | 9/2008 | Yagawa ........................ 713/189 |
| 2008/0235666 A1* | 9/2008 | Bhandari et al. .............. 717/123 |
| 2008/0301457 A1* | 12/2008 | Uesugi et al. ................. 713/178 |
| 2010/0031049 A1* | 2/2010 | Shima et al. .................. 713/176 |

FOREIGN PATENT DOCUMENTS

| | | |
|---|---|---|
| WO | WO 00/54128 | 9/2000 |
| WO | WO 2004/032329 | 4/2004 |
| WO | WO 2005/104426 | 11/2005 |

OTHER PUBLICATIONS

Author Unknown, "Mechanism and apparatus for determining time on a disconnected machine," Research Disclosure, Dec. 2000, 2 pages, vol. 440.

Lie, David, et al., "Specifying and Verifying Hardware for Tamper-Resistant Software," Proceedings of the 2003 IEEE Symposium on Security and Privacy (SP'03), May, 2003, 12 pages, IEEE.

* cited by examiner

CLOCK ROLL FORWARD DETECTION

FIELD OF THE INVENTION

This invention relates to computers, data security, and more specifically to controlling use of time-related digital content using Digital Rights Management.

BACKGROUND OF THE INVENTION

This disclosure relates to Digital Rights Management (DRM) for protection of audio and/or video data in a playback device such as a computer or computing device or audio or video media player. DRM refers to standards and proprietary systems where a content item has associated data that specifies user rights. The protection of digital content transferred between computers over a network and transferred from a computer or other host device or a server to an associated playback device is important for many organizations. The DRM process often involves encrypting the pieces of content (e.g., encrypting the binary form of the content) to restrict usage to those who have been granted a right to the content, which is typically pieces of music or video programs.

Cryptography is the traditional protection method, but for many digital file transfer situations, a party that legitimately receives the content might try to break the DRM protection scheme, so as to give illicit access to third parties or himself. Hence, an identified weak link in the DRM security is in the overall process, rather than the encryption scheme. For instance, one of the more successful DRM schemes distributes music and video content via the Internet. The DRM system distributes to a user's computer content that has been encrypted. The user's computer then decrypts the received content, generates local keys for encrypting the content, and uses the local keys to re-encrypt the content. Typically, the content in encrypted form may also be downloaded, via a local connection such as a USB (universal serial bus) connection, to an associated playback-only device such as an audio or video media player, which similarly decrypts and re-encrypts the content before playing same.

One of the major challenges in Digital Rights Management is the implementation of time enforcement. There is a time-dependent factor in many applications of DRM, notably in the protection of rental content (such as video programs, movies, etc.). In this scenario, a user purchases the rights to access an item of content for a given period of time such as a month where typically the content is distributed as a digital file over the Internet but including tangible media such as DVDs, CDs, etc. The role of DRM software in this situation is to allow the content to be accessed by the user during the agreed upon period of time and disallow access at any other time. See Vataja, U.S. Publication No. 2005/0204209, published Sep. 15, 2005 and McKune, U.S. Publication No. 2002/0169974, published Nov. 14, 2002, both incorporated herein by reference in their entirety.

Many current DRM schemes have this functionality and enforce it by using a secure time server or hardware clock. When the user tries to access the content using his playback device, the DRM software connects across a network (e.g., the Internet) to a secure time server and queries the current time. If the time returned over the network from the server is within the correct period, the DRM software allows playback. This scheme has a major drawback; the user must be connected to the network at the time of content playback. This restriction is not feasible for certain mobile playback devices without network connectivity, in situations where content needs to be accessed offline and for platforms (playback devices) with no internal secure hardware clock.

SUMMARY

The present inventors have found that a new solution is needed for enforcing content time restrictions on platforms that are not connected to a network and do not have a secure hardware clock. The present solution is a process and system that checks the status of the host system (e.g., a user media playback device) with respect to the system clock. The expectation is that if the system's clock has been set backwards by a "hacker" (a person who wants to defeat the DRM), the associated host's file system will exhibit some telltale signs of this manipulation. One problem with looking at the current state of a system is that the state of a system tends to realign itself. This is especially true if in the attack the system clock is only changed for a small period of time. An attack here generally refers to altering of time to by-pass time protection associated with a content item.

The host system is e.g., a computer, personal digital assistant, media playback device, cellular telephone device with media playback capability, or other type of computing device.

The usual clock roll-forward attack involves the hacker choosing a specific time far in the future as the active time period for an asset (item of content protected by DRM). Access to the content is granted by moving the system clock forward to that date. Once the asset has been accessed by the hacker, the clock is returned by the hacker to the actual date and the system will realign itself. To access the asset again at a later date, the hacker sets the clock to a future date within the active time period of the asset.

The present approach detects this attack by an event detection mechanism using particular stored state information about the host system. Every time an asset is opened, time information is stored about a subset of system files. The present method then determines (detects) if the system has been subjected to a roll-forward attack by comparing the current time information of those files with the previously recorded time and the last time the files were scanned. If there has been a roll-forward attack, then access to the keys needed to decrypt the content item is denied by the DRM system. McKune, referred to above, also detects clock tampering by doing a comparison of current time with a stored time.

There are two possible results when checking a time stamp of a file on a computer system with a currently valid (non-tampered with) forward-moving clock: the time stamp was not modified since the last time it was checked or the time stamp was modified after the last time checked it. If a file's time is older than the last scan time but different than the previous time it was checked, something has happened out of order. In this case, the clock likely has earlier been rolled back to before the previous scan time, or the clock has been set to a future date when the last scan occurred. The present method detects when a file has been modified when the system clock has been rolled forward and also detects if the file's modification time has been tampered with to hide this modification.

DETAILED DESCRIPTION

The first time the present method is called by the DRM system in the host system, the present method records the current file system time (the system clock time) of several specifically selected files and stores each of the file system times in a secure database associated with the DRM in the host system. These files are typically content files, system files, user preference files or cache files. Secure here means difficult for a hacker to tamper with, such as encrypted. A digest is taken of the content of each of these files and also stored in the database. This digest may be computed using a hash function, or otherwise. Hash functions are well known in the data security field; they are one-way functions which generate a value from digital data, where the data cannot be (practically) generated from its hash function value. Hash functions are often used for verification and authentication of data. This establishes an initial state for the host system.

Subsequently, when the present method is again called by the DRM system, the secure database is accessed and the system times of the files listed in the database are queried. The method is called when verifying system integrity, usually at playback time of an item of content. The present method is typically implemented in software (as is the rest of the DRM system) and called (invoked) as a routine or software module by the DRM system. A "sanity" check of the returned values from the query is performed by the method. This means that the time of a file is judged valid if it has not changed since the last such check or it has changed to a value more recent than that of the last such check. Failing this check indicates that the file has been modified, accessed or changed by the hacker while the system clock was in an unnatural state as a result of the hacker's tampering.

Furthermore, if the file itself has been modified, then its digest by definition will be different. If the time of last modification of the file has not changed, but the file's digest is different, this indicates that the last modification time of the file has been tampered with. If this check is passed, then the current time is added to the database under "last scan time" and the modification time and current digest of each file is added to the database.

Figure 1:
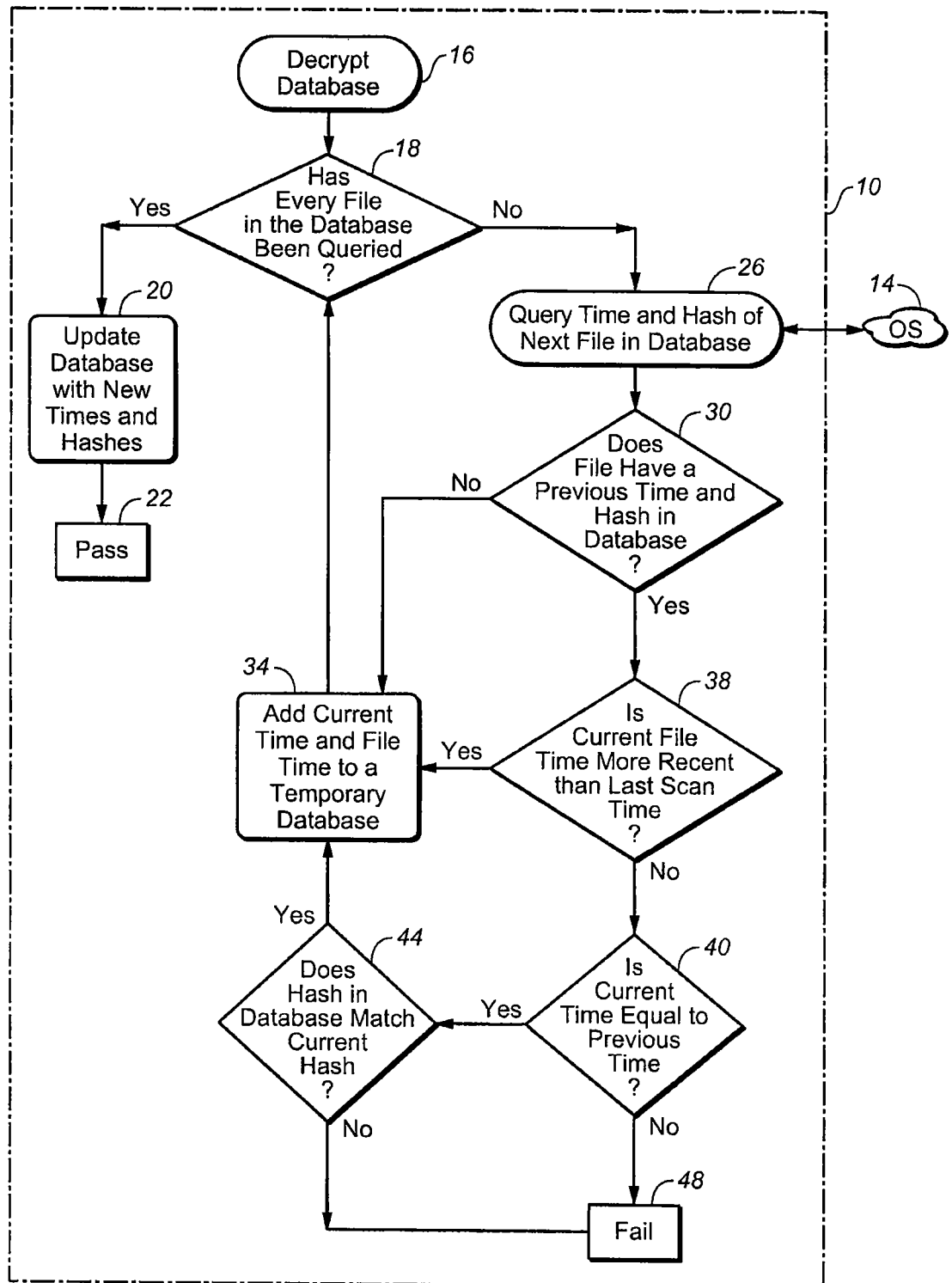
FIG. 1 is a flowchart of the present method.

FIG. 1 shows in a flowchart the present method. The DRM system with this method added is designated at 10 and interacts with the conventional host system operating system 12. (Some media playback devices do not have a conventional operating system but do include equivalent functionality.) The database of files referred to above is secure, e.g., encrypted, and to be accessed its content is decrypted at 16. Next at 18 it is determined if every file listed in the database has been queried; if "yes" the database is updated as described above at 20 and the "sanity" check is deemed passed at 22, whereupon access is granted to the content item. If "no" at 18, next at 26 the next file in the database is queried. Then at 30 that file is checked as having a previous time and hash value. If "no" at 30, next at 34 a temporary database entry is created for that file with the currently time and the file time. If "yes" at 30, next at 38 the current file time is checked and if "yes" control passes to 34. If "no" at 38, control passes to 40 where the current time is checked against the previous time in the database for that file.

If "yes" at 40, control passes to 44 where the current digest (e.g., hash) value for that file is matched to the digest (e.g., hash) value for that file in the database. If "no" at 44, the check is failed at 48, as is the case for "no" at 40. If the test is failed, the current content item access is denied. No digest check is done if the file time is more recent than the last scan time, since then the file may have been altered for a valid reason since the time stamp has moved forward.

Digests of files (using, e.g., hash functions such as MD5, SHA-1, SHA-2 or others) may be replaced here by any file content identification technique. A weak such technique is a sample of the first and last bytes, and a set of random offset bytes (of fixed length) and would improve performance over use of a hash by reducing computational time at the expense of weaker security. A strong technique is using known hash algorithms as described above performed on the entire file content.

The file database would contain, e.g., entries for either all the files listed in a given directory, or for a sample of random files located in these directories. This sample approach would be useful for directories containing a large number of files (such as logs, mail cache, or a web browser cache).

Coding the software to carry out the present method would be routine in light of this disclosure. A typical computer language for the source code software would be C, although usually only the compiled version (object code) of the software would be installed in the host device in a memory. Hence contemplated here is the method, the memory medium in the host system holding the associated code, and the resulting host system programmed with the code so as to carry out the method.

Figure 2:
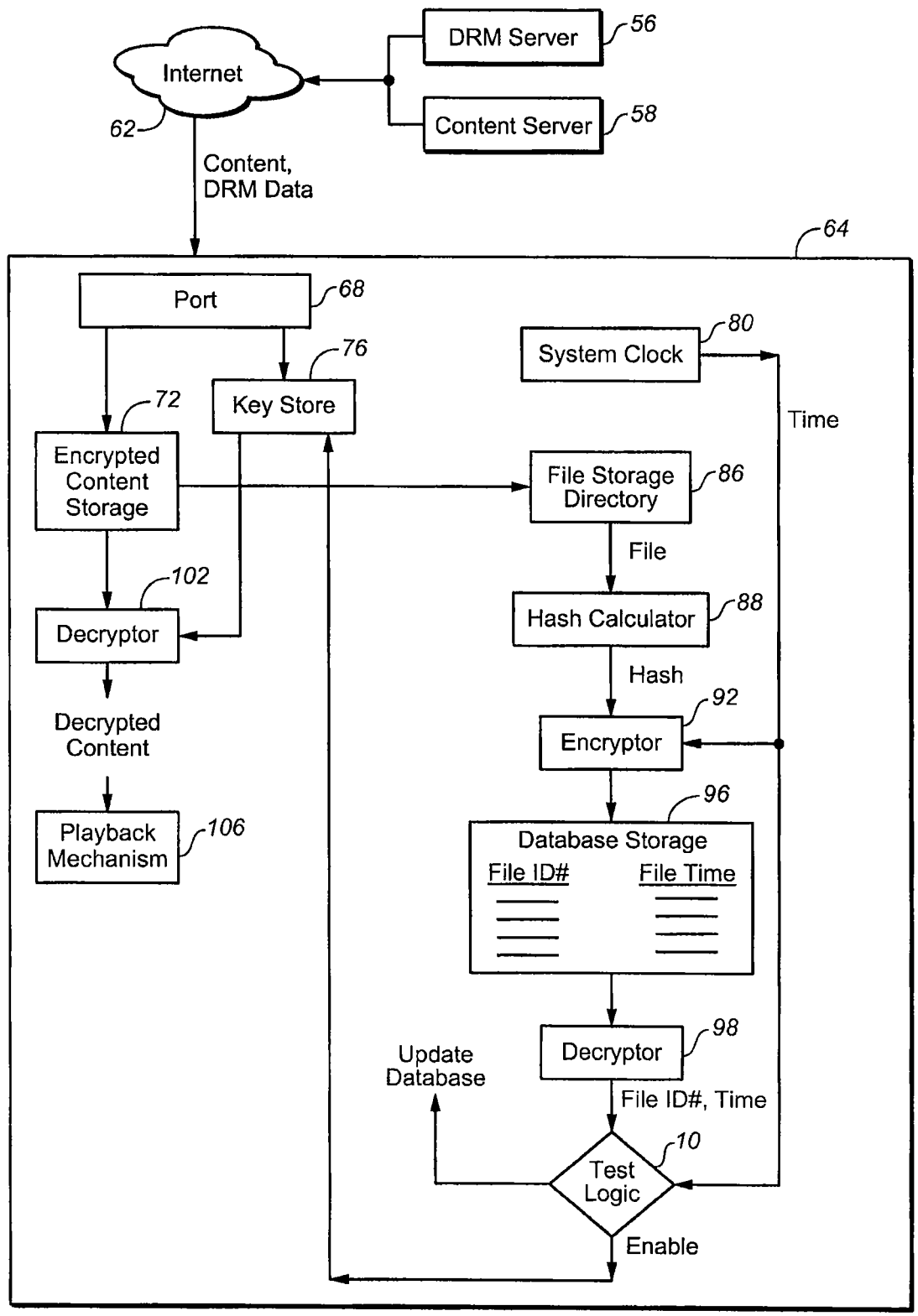
FIG. 2 is a block diagram of a host system to carry out the FIG. 1 method.

FIG. 2 shows in a block diagram the environment of the FIG. 1 method and an associated apparatus 64 operating in that environment. The conventional DRM server 56 and content server 58 are part of e.g. an on-line (Internet based) store for selling and/or renting audio and video content items (assets) which are stored in encrypted form on content server 58 and conventionally distributed over the Internet 62 to a playback device (host system) 64 which receives the encrypted or otherwise protected content and the associated DRM data from server 56 including usually decryption keys, at its port 68. The encrypted content is conventionally stored in device 64 content storage memory 72 and the DRM keys in storage 76.

Device 64 also has conventionally its system clock 80 and file storage directory 86. This directory (or set of directories) is a directory to the files in storage 72 and is maintained conventionally by the host system's operating system 14 (shown in FIG. 1 but omitted from FIG. 2 for simplicity). As shown in FIG. 1, individual files listed in directory 86 are each subject to a hash function at hash calculator 88 and the resulting hash value and the current time as indicated by system clock 80 are encrypted at encryptor 92 and stored in the secure data base storage 96 in their encrypted form.

Then when database 96 is accessed at 26 in FIG. 1 upon invocation of the present method, the associated entry in database 96 is decrypted at decryptor 98 to provide the relevant file identification value (the hash value) and the file system time. This information is subject to the tests shown at 10 in FIG. 1, using as the other input to logic tests 10 the current time as indicated by system clock 80. The output from test 10 is the database update shown at 20, 34 in FIG. 1, and if the logic test is passed an enable signal (shown at 22 in FIG. 1) is provided to enable key store 76 to provide its keys. The keys are supplied then to conventional decryptor 102 to decrypt the associated content. The decrypted content item is then passed to the conventional playback mechanism 106 for play. Note that operation of device 64 is conventionally under control of a processor (not shown) which executes the operating system 10 and the operations shown in FIG. 1 and FIG. 2.

The present method and apparatus are applicable in number of contexts, including a host device coupled to a conventional computer network such as the Internet, and a personal area network (PAN) where a PAN is a computer network operating over a very short distance such as a few meters.

This disclosure is illustrative but not limiting; further modifications will be apparent to those skilled in the art in light of this disclosure and are intended to fall within the scope of the appended claims.

What is claimed as new and desired to be protected by Letters Patent of the United States is:

1. A method for detecting tampering with timing in a system before allowing access to a piece of protected content, wherein the time is maintained by a clock associated with the system, the method comprising:
   storing, for each of a plurality of files stored by the system, (i) a time stamp that indicates a most recent time that the file was modified, and (ii) a content identification value that is based on content of the file, such that if the content of the file has been modified, the content identification value of the file is different, wherein the plurality of files comprises a group of files that does not include the piece of protected content:
   receiving a request to access the piece of protected content;
   in response to receiving the request, for each file of a set of the plurality of files:
      determining a relationship between the stored time stamp of the file and a current time stamp of the file; and
      when the stored time stamp of the file and the current time stamp of the file are the same, determining whether the stored content identification value is the same as a current content identification value; and
   enabling the system to access the piece of protected content when (i) no stored time stamp for any particular file is more recent than the current time stamp for the particular file, and (ii) for all files for which the stored time stamp is the same as the current time stamp, the stored content identification value is the same as the current content identification value.

2. The method of claim 1 further comprising, for each file of the set of the plurality of files, replacing (i) the stored time stamp with the current time stamp and (ii) the stored content identification value with the current content identification value for each file when the current time stamp of the file is more recent than the stored time stamp of the file.

3. The method of claim 1, wherein enabling the system to access includes providing at least one key for decrypting the piece of protected content.

4. The method of claim 1, wherein the method is part of a Digital Rights Management system.

5. The method of claim 4, wherein the Digital Rights Management system sets a time period for access to the file.

6. The method of claim 1, wherein the system is one of a computer, mobile telephone device, media playback device, and personal digital assistant.

7. The method of claim 1, wherein the system is not connected to a network during performance of the method.

8. The method of claim 1, wherein determining the relationship between the current time stamp and the stored time stamp comprises determining whether the current time stamp is (i) more recent than the stored time stamp, (ii) the same as the stored time stamp, or (iii) older than the stored time stamp.

9. The method of claim 1, wherein said storing comprises storing in a secure manner.

10. The method of claim 9, wherein the secure manner includes encryption.

11. The method of claim 1, wherein said storing comprises storing the time stamp and content identification value for each file in a database.

12. The method of claim 1, wherein the plurality of files comprises all files in a directory.

13. The method of claim 1, wherein the plurality of files comprises only selected files in a directory.

14. A computing device comprising:
   a set of processing units;
   a non-transitory machine readable storage for storing a computer program, the computer program comprising sets of instructions for:
      storing, for each of a plurality of files stored by the computing device, (i) a time stamp that indicates a most recent time that the file was modified, and (ii) a content identification value that is based on content of the file, such that if the content of the file has been modified, the content identification value of the file is different, wherein the plurality of files comprises a group of files that does not include a piece of protected content;
      receiving a request to access the piece of protected content;
      in response to receiving the request, for each file of a set of the plurality of files:
         determining a relationship between the stored time stamp of the file and a current time stamp of the file; and
         when the stored time stamp of the file and the current time stamp of the file are the same, determining whether the stored content identification value is the same as a current content identification value; and
      enabling the computing device to access the piece of protected content only when (i) no stored time stamp for any particular file is more recent than the current time stamp for the particular file, and (ii) for all files for which the stored time stamp is the same as the current time stamp, the stored content identification value is the same as the current content identification value.

15. A non-transitory machine readable medium for storing a computer program for execution in a computing device, the computer program comprising sets of instructions for:
   storing, for each of a plurality of files stored by the computing device, (i) a time stamp that indicates a most recent time that the file was modified, and (ii) a content identification value that is based on content of the file, such that if the content of the file has been modified, the content identification value of the file is different, wherein the plurality of files comprises a group of files that does not include a piece of protected content;
   receiving a request to access the piece of protected content;
   in response to receiving the request, for each file of a set of the plurality of files:
      determining a relationship between the stored time stamp of the file and a current time stamp of the file; and
      when the stored time stamp of the file and the current time stamp of the file are the same, determining whether the stored content identification value is the same as a current content identification value; and
   enabling the computing device to access the piece of protected content only when (i) no stored time stamp for any particular file is more recent than the current time stamp for the particular file, and (ii) for all files for which the stored time stamp is the same as the current time stamp, the stored content identification value is the same as the current content identification value.

16. The non-transitory machine readable medium of claim 15, wherein the program further comprises a set of instructions for replacing, for each file of the set of the plurality of files, (i) the stored time stamp with the current time stamp and (ii) the stored content identification value with the current content identification value for each file when the current time stamp of the file is more recent than the stored time stamp of the file.

17. The non-transitory machine readable medium of claim 15, wherein the set of instructions for enabling the computing device to access comprises a set of instructions for providing at least one key for decrypting the piece of protected content.

18. The non-transitory machine readable medium of claim 15, wherein the set of instructions for storing comprises a set of instructions for storing in a secure manner.

19. The non-transitory machine readable medium of claim 18, wherein the secure manner includes encryption.

20. The non-transitory machine readable medium of claim 15, wherein the plurality of files comprises all files in a directory.

21. The computing device of claim 14, wherein the program further comprises a set of instructions for replacing, for each file of the set of the plurality of files, (i) the stored time stamp with the current time stamp and (ii) the stored content identification value with the current content identification value for each file when the current time stamp of the file is more recent than the stored time stamp of the file.

22. The computing device of claim 14, wherein the set of instructions for enabling the computing device to access comprises a set of instructions for providing at least one key for decrypting the piece of protected content.

23. The computing device of claim 14, wherein the set of instructions for storing the content identification value comprises a set of instructions for calculating the content identification value using a hash function.

24. The computing device of claim 14, wherein the set of instructions for storing the content identification value comprises a set of instructions for calculating the content identification value using a set of bytes of the content of the file.

25. The computing device of claim 24, wherein the set of bytes comprises a first byte and a last byte of the content of the file.

* * * * *